US006155151A

United States Patent [19]

Reichert

[11] Patent Number: 6,155,151

[45] Date of Patent: Dec. 5, 2000

[54] CUTTER DRUM FOR WEB-CUTTING MACHINE

[75] Inventor: Peter Reichert, Dusseldorf, Germany

[73] Assignee: Jagenberg Papiertechnik GmbH, Neuss, Germany

[21] Appl. No.: 09/093,848

[22] Filed: May 20, 1998

[30] Foreign Application Priority Data

Jun. 25, 1997 [DE] Germany ........................... 197 26 993

[51] Int. Cl.[7] ..................................................... B23D 25/02

[52] U.S. Cl. ............................ 83/342; 83/698.61; 83/672

[58] Field of Search ........................ 83/672, 659, 698.41, 83/663, 355, 356.3, 674, 698.51, 698.61, 699.41, 343

[56] References Cited

U.S. PATENT DOCUMENTS

| | | | |
|---|---|---|---|
| 2,181,197 | 11/1939 | Moritz | 164/28 |
| 2,478,240 | 8/1949 | Christman | 164/66 |
| 3,084,582 | 4/1963 | Anderson | 88/341 |
| 3,166,965 | 1/1965 | Stemmler | 83/175 |
| 3,230,809 | 1/1966 | Liick | 83/341 |
| 3,606,811 | 9/1971 | Hallden | 83/305 |
| 3,709,077 | 1/1973 | Trogan | 83/152 |
| 3,822,625 | 7/1974 | Obenshain | 83/342 |
| 3,857,314 | 12/1974 | Gregoire | 83/346 |
| 4,041,816 | 8/1977 | Shearon | 83/100 |
| 4,159,661 | 7/1979 | Russell . | |
| 4,714,294 | 12/1987 | Swan | 299/39 |
| 4,907,631 | 3/1990 | Krautzberger | 144/230 |

FOREIGN PATENT DOCUMENTS

| | | |
|---|---|---|
| 0 193 693 | 9/1986 | European Pat. Off. . |
| 0 736 362 | 10/1996 | European Pat. Off. . |
| 89 00 516 | 4/1989 | Germany . |
| 43 21 163 | 6/1993 | Germany . |
| 42 40 232 | 6/1994 | Germany . |
| 295 12 032 U | 11/1995 | Germany . |
| 195 45 003 | 6/1997 | Germany . |

*Primary Examiner*—Lee Young
*Assistant Examiner*—Sean Smith
*Attorney, Agent, or Firm*—Herbert Dubno; Andrew Wilford

[57] ABSTRACT

A cutter drum for a web-cutting machine has a body having a cylindrical outer surface centered on an axis and formed with at least one seat having a radially outwardly directed floor face extending axially and helically of the axis and a tangentially directed rear face extending generally radially of the axis. A helically nonstraight blade lies flat on the floor face and has a front cutting edge lying radially outside the surface and a rear side confronting and spaced from the rear face of the seat. Blade bolts extending generally radially of the axis through the blade are seated in the body and secure the blade to the floor face with a possibility, when the blade bolts are not tightened, of limited movement of the blade on the floor face. A plurality of axially spaced spacer blocks each have a rear edge bearing against the rear face of the seat and a front edge bearing against the rear side of the blade. Respective block bolts extend through the blocks into the body and secure the blocks in the seat to the body.

11 Claims, 4 Drawing Sheets

FIG. 1
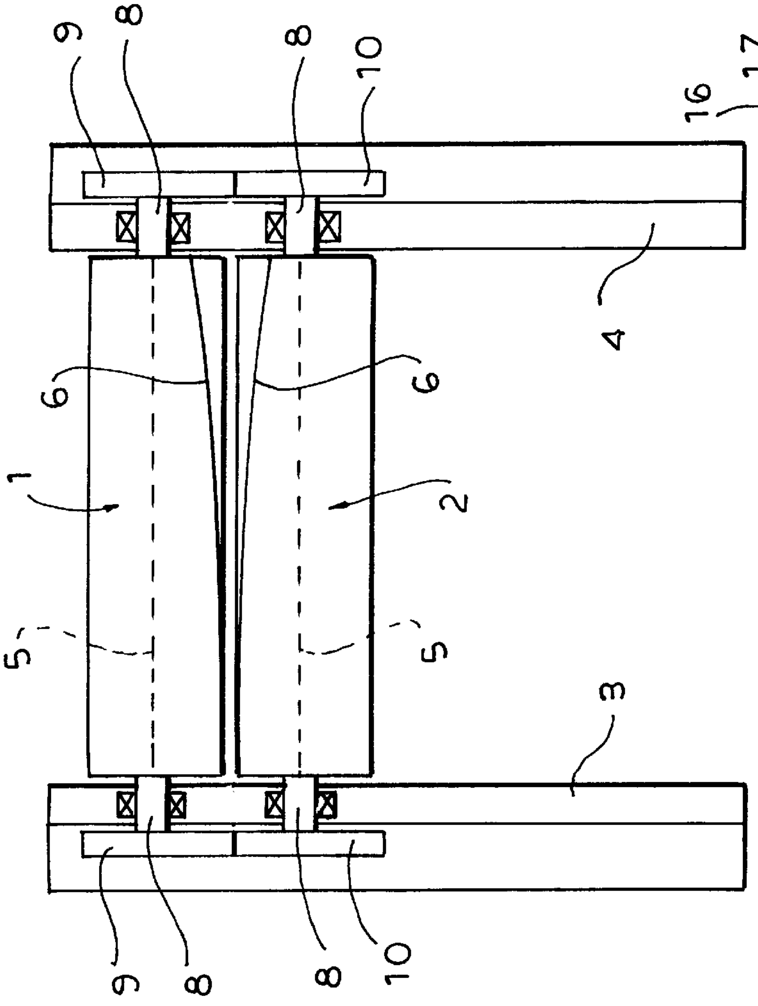
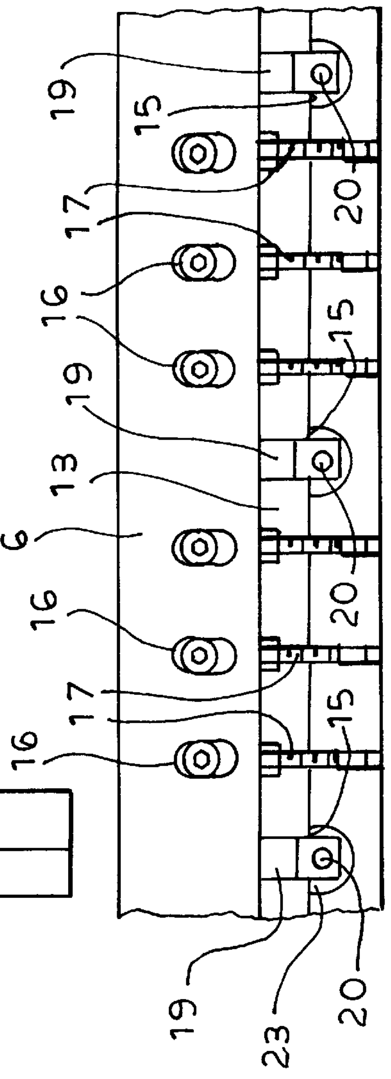
FIG. 4

CUTTER DRUM FOR WEB-CUTTING MACHINE

FIELD OF THE INVENTION

The present invention relates to a cutter drum. More particularly this invention concerns such a drum used in a high-speed machine that serves to cut a rapidly moving web into a succession of sheets.

BACKGROUND OF THE INVENTION

A standard web-cutting machine comprises a pair of cylindrical drums rotatable about parallel and normally vertically spaced axes as described in "Querschneider an Papierverarbeitungsmaschinen" (*Allaemeine Papierrundschau* April 1965). Each drum is normally formed with at least one axially extending groove in which is set a blade. The drums are rotated or moved synchronously so that the blades periodically come together, cutting through a web passing horizontally between the drums. The blades can be straight, in which case they engage the workpiece web along its entire width simultaneously. It is also known to make them somewhat helical so that they engage the workpiece at a point that moves from one side to the other of the workpiece as it passes between the drums, forming what ends up as a perfectly straight perpendicular cut, produced by coordination of the advance rate of the workpiece, the peripheral velocities of the blades, and the angular dimension of the blade helix. Such systems are described in German 4,240,232 of Titz, 4,321,163 of Pfirrmann, 195 45 003 of Stitz, and 89 00 516 assigned to BHS Ag.

Obviously these blades must meet perfectly in order to cut smoothly and form a neat edge on the sheets produced. The standard procedure is therefore to provide some form of adjustment. In the simplest system the blade is simply bolted to the drum via slots so it can be positioned before the bolts are torqued down. For finer control of the adjustment, bolts threaded or otherwise seated in the drum bear on rear edges of the blade so that when rotated they displace the blade tangentially and, if necessary, radially into the desired position. Once properly positioned the blades are bolted tightly in place. Such systems are described in U.S. Pat. No. 4,159,661 of Russell, German utility model 195 12 032 assigned to Will GmbH, European 0,193,693 of Takenaka, and European 0,736,362 of Gross.

Even these last-described systems present considerable difficulties in setup. In particular when the blades have been taken out and sharpened, it is just as difficult to align them on reinstallation as it is with new machines. With the screw-adjuster systems all the screws must be advanced and then the fit tested, the screws readjusted, and so on. Thus the down time is considerable.

OBJECTS OF THE INVENTION

It is therefore an object of the present invention to provide an improved cutter drum for a web-cutting apparatus.

Another object is the provision of such an improved cutter drum for a web-cutting apparatus which overcomes the above-given disadvantages, that is which allows the blades to be reinstalled, for example after sharpening, and properly set with minimal down time.

SUMMARY OF THE INVENTION

A cutter drum for a web-cutting machine has according to the invention a body having a cylindrical outer surface centered on an axis and formed with at least one seat having a radially outwardly directed floor face extending axially and helically of the axis and a tangentially directed rear face extending generally radially of the axis. A helically nonstraight blade lies flat on the floor face and has a front cutting edge lying radially outside the surface and a rear side confronting and spaced from the rear face of the seat. Blade bolts extending generally radially of the axis through the blade are seated in the body and secure the blade to the floor face with a possibility, when the blade bolts are not tightened, of limited movement of the blade on the floor face. A plurality of axially spaced spacer blocks each have a rear edge bearing against the rear face of the seat and a front edge bearing against the rear side of the blade. Respective block bolts extend through the blocks into the body and secure the blocks in the seat to the body.

Thus with this system the position of the blade can be coarsely set by means of the spacer blocks. Since the seat is very accurately formed and the blades are of a constant front-to-back width, it is possible to use a set of identical spacer blocks to set the initial position of the blade. According to the invention the blocks are elongated so that they can be turned to differently space the rear blade side from the rear seat face. Thus when the blade is of its maximum front-to-back width when it is new the blocks are fitted in so that their short dimension is employed. After the blade is ground down, the blocks can be rotated 90°, for example making their effective front-to-back dimension 1 mm longer, to compensate for what has been ground off the front edge of the blade.

This double use of the blocks is also achieved when they are T-shaped with a central leg through which the respective block bolts extend and a pair of arms of different thickness. The arms each have an outer surface forming a front edge and an inner surface forming a rear edge. The rear edge of one of the arms is differently spaced from the respective front edge than the edges of the other arm so that the T-shaped blocks can be turned over to differently space the rear blade side from the rear seat face. For most compact construction the body is formed in its surface behind the rear face with respective cutouts receiving the central legs of the T-shaped spacer blocks.

For fine adjustment according to the invention a plurality of tangentially directed and axially spaced adjustment screws threaded into the body have ends bearing on the rear blade side. For each spacer block there are at least three uniformly spaced adjustment screws.

The body can have a main body part of plastic formed with a groove and a metallic insert fixed in the groove and forming seat. More particularly, the main part is formed by an inner sleeve of fiber-reinforced plastic whose fiber reinforcement runs at an angle of between 30° and 60°, preferably 45°, to the axis and an outer sleeve of fiber-reinforced plastic whose fiber reinforcement runs at an angle of less than 30°, preferably less than 10°, to the axis. Alternately, of course, the body can be entirely made of steel in which case no separate metal inserts need be provided to form the seat faces.

BRIEF DESCRIPTION OF THE DRAWING

The above and other objects, features, and advantages will become more readily apparent from the following description, reference being made to the accompanying drawing in which:

FIG. 1 is a small-scale end view of a web-cutting machine according to the invention;

FIG. 4 is a view looking radially inward at a detail of one of the cutter drums.

SPECIFIC DESCRIPTION

Figure 2:
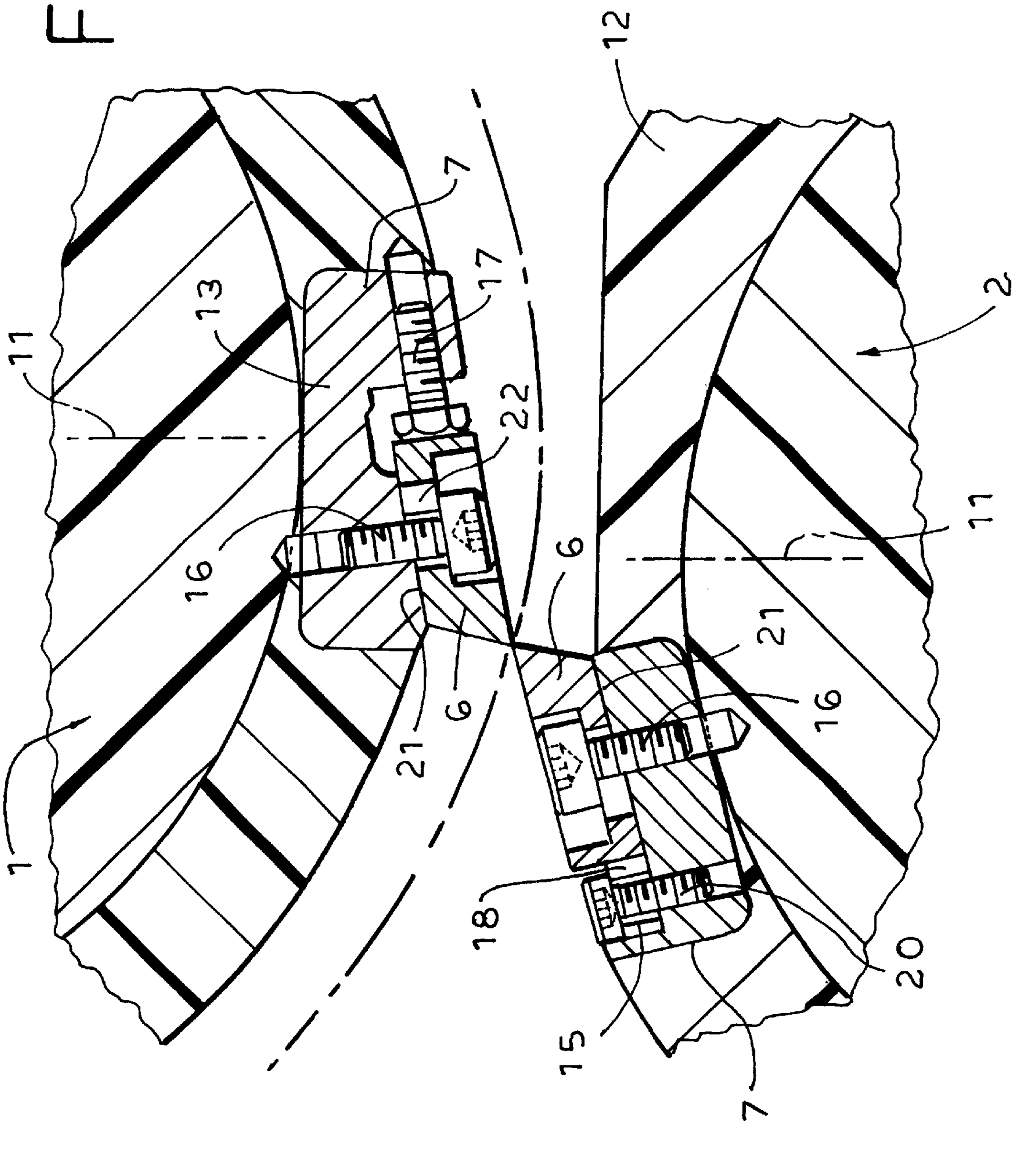
FIGS. 2 and 3 are large-scale cross sections through the blade assembly of the FIG. 1 machine at different axial positions therealong.

As seen in FIG. 1 a web-cutting machine according to the invention has upper and lower drums 1 and 2 mounted between a pair of uprights 3 and 4 for rotation about parallel horizontal axes 5. The drums 1 and 2 have central end pins 8 interconnected by gears 9 and 10 for synchronous rotation. Each drum 1 and 2 carries a pair of generally helically extending blades 6 although below for simplicity's sake only one such blade assembly for each drum 1 or 2 is described.

Figure 3:
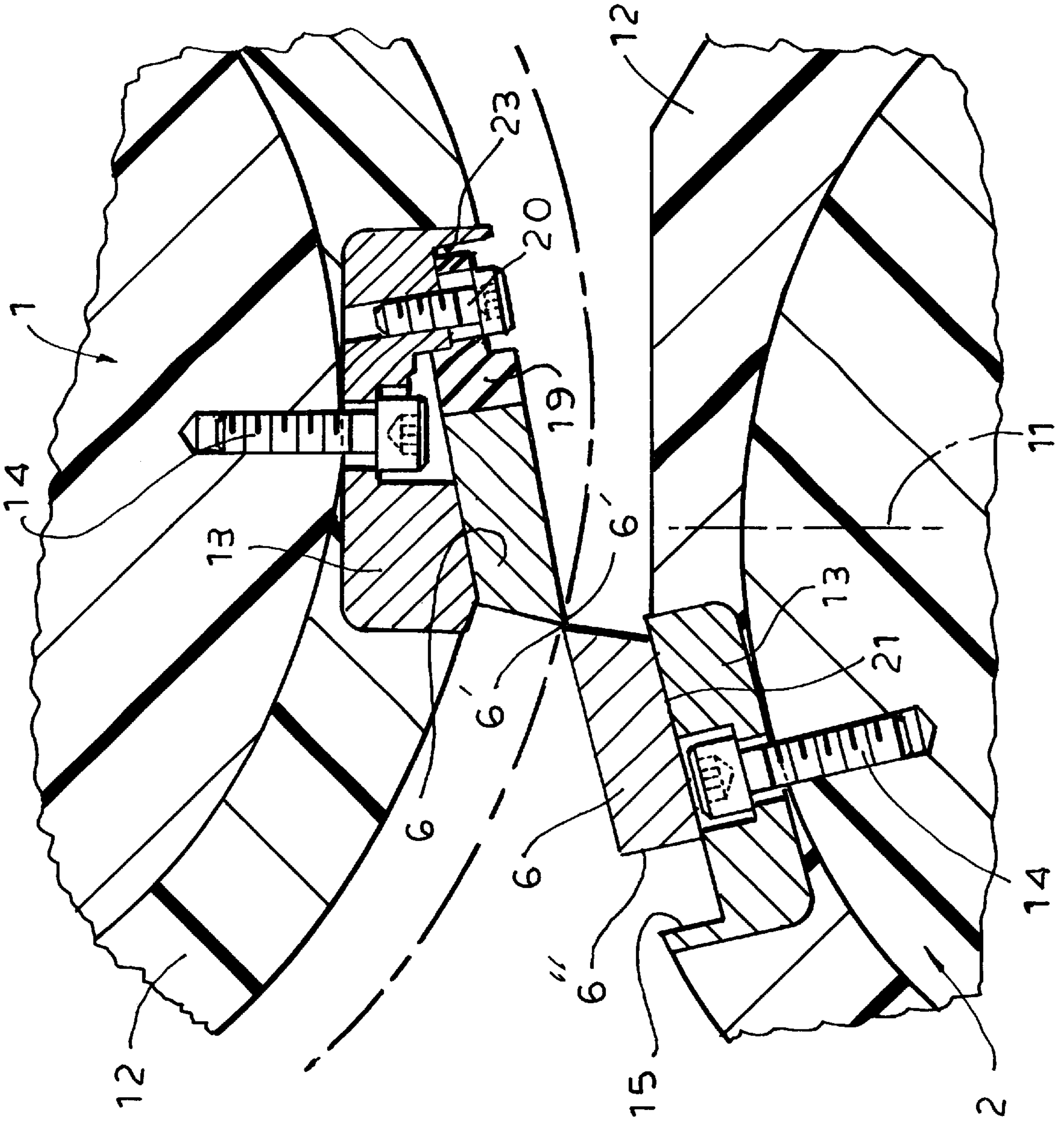

More particularly as shown in FIGS. 2, 3, and 4, each drum 1 and 2 is formed by a cylindrically tubular inner sleeve 11 and another cylindrically tubular outer sleeve 12, the latter formed for each blade 6 with a generally helical groove 7 fitted with a steel seat-forming insert 13. The inner sleeve 11 has a radial thickness at least equal to that of the outer sleeve 12 and preferably 1.1 to 3 times as great, twice as great when they both have reinforcement of the same modulus of elasticity. Here the inner sleeve has an inside diameter of 110 mm, a wall thickness measured radially of 40 mm, and the outer sleeve 12 has a wall thickness of 20 mm so that the groove 7 is wholly in the outer shell 12.

In addition the inner sleeve 11 is designed to resist torsion by being made of plastic with its carbon-fiber reinforcement running at 30° to 60°, preferably 45°, to the axis 5 while the thinner outer sleeve is designed to resist bending so that its carbon-fiber reinforcement runs at most at 30°, preferably less than 10° and here 5° to 8°, to the axis 5. If this latter angle is reduced to 0°, one can only rotate the drum in one direction.

The insert 13 has a floor face 21 extending as shown in FIGS. 2 and 3 at an angle of between 0° and 45° to a tangent of the drum 1 or 2 and a rear face 15 together defining a seat for the respective blade 6. Bolts 14 seated in the inner sleeve 11 fix the insert 13 in place. The blades 6 are each of right-trapezoidal section and sit flatly on the face 21, with a cutting edge 6' projecting radially past the outer surface of the drum 1 or 2 and a rear side 6" angularly confronting and spaced from the rear seat face 15. Screws 16 seated in the inserts and spaced about every 50 mm along the blade 6 extend through slots 22 in the blade 6 to fix it in place in the seat 15, 21. Further screws 17 extending parallel to the floor face 21 and threaded into the insert 13 or into the drum 1 or 2 are provided adjacent the screws 16, thus at a 50 mm spacing, and serve for fine adjustment of the position of the cutting edge 6'.

According to the invention, the drum 2 has solid plastic spacer blocks 18 of nonsquare rectangular shape that are fitted behind the blade 6 of the drum 2, engaged snugly between the rear face 15 and the rear side 6". Respective screws 20 pass through these blocks 18 and secure them in place. They are 1 mm longer than they are wide so that they can be taken out and turned 90° after the blade 6 has been ground down to compensate for the lost blade width.

The drum 1 has T-shaped spacer blocks 19 each having a pair of arms of different width and a leg traversed by a hold-down screw 20 and seated in a recess 23. The arms each have an outer surface forming a front edge and an inner surface forming a rear edge and the rear edge of one of the arms is differently spaced from the respective front edge than the rear edge of the other arm. Thus these T-shaped blocks 19 can be turned over to differently space the rear blade side from the rear seat face.

In both cases the blocks 10 or 18 are spaced more widely than the screws 16 or 17. Here they are set at 150 mm, three times the spacing of these screws 16 and 17.

Figure 5:
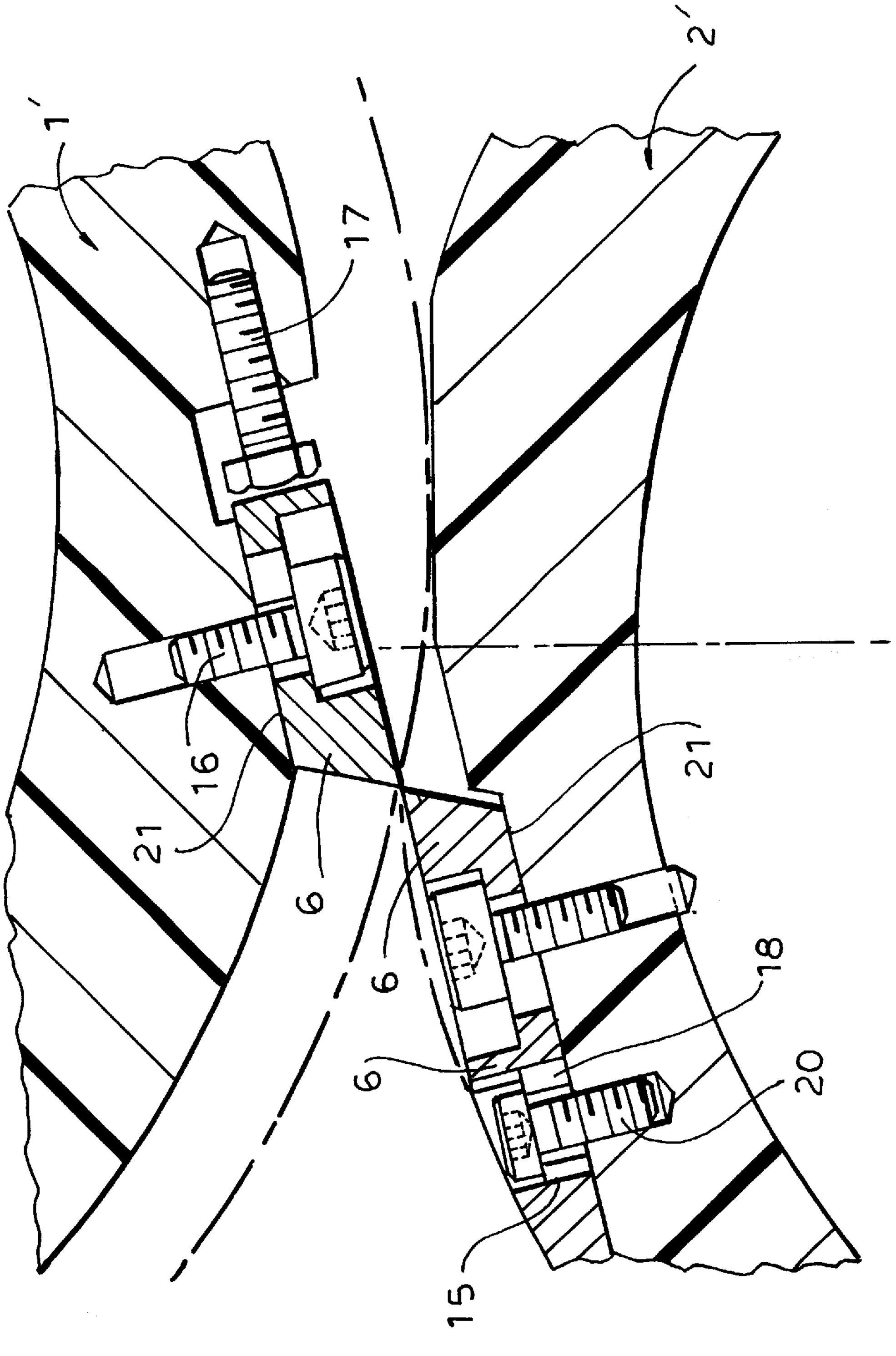
FIG. 5 is a section like FIG. 2 through another drum in accordance with the invention.

In FIGS. 4 and 5 the drums 1' and 2' are wholly made of steel so that no inserts 13 and screws 14 are needed. Otherwise this arrangement is identical to that of FIGS. 2 and 3.

I claim:

1. A cutter drum for a web-cutting machine, the drum comprising:

a body having a cylindrical outer surface centered on an axis and formed with at least one seat having a radially outwardly directed floor face extending axially and helically of the axis and a tangentially directed rear face extending generally radially of the axis;

a blade lying flatly on the floor face and having a front cutting edge lying radially outside the surface and a rear side confronting and spaced angularly from the rear face of the seat;

blade bolts extending generally radially of the axis through the blade, seated in the body, and securing the blade to the floor face such that, when the blade bolts are not tightened, the respective blades can move limitedly tangentially of the body on the floor face;

a plurality of axially spaced spacer blocks each having a rear edge bearing directly against the rear face of the seat and a front edge bearing directly against the rear side of the blade; and respective block bolts extending through the blocks into the body and securing the blocks in the seat to the body.

2. The cutter drum defined in claim 1 wherein the blocks are elongated, whereby the blocks can be turned to differently space the rear blade side from the rear seat face.

3. The cutter drum defined in claim 1 wherein the blocks are T-shaped with a central leg through which the respective block bolts extend and a pair of arms of different thickness, the arms each having an outer surface forming a front edge and an inner surface forming a rear edge, the rear edge of one of the arms being differently spaced from the respective front edge than the edges of the other arm, whereby the T-shaped blocks can be turned over to differently space the rear blade side from the rear seat face.

4. The cutter drum defined in claim 3 wherein the body is formed in its surface behind the rear face with respective cutouts receiving the central legs of the T-shaped spacer blocks.

5. The cutter drum defined in claim 1, further comprising a plurality of tangentially directed and axially spaced adjustment screws threaded into the body and having ends bearing on the rear blade side.

6. The cutter drum defined in claim 5 wherein for each spacer block there are at least three uniformly spaced adjustment screws.

7. A cutter drum for a web-cutting machine, the drum comprising:

a body having a cylindrical outer surface centered on an axis and formed with at least one seat having a radially outwardly directed floor face extending axially and helically of the axis and a tangentially directed rear face extending generally radially of the axis, the body further having a main body part of plastic formed with a groove and a metallic insert fixed in the groove and forming the seat;

a blade lying flatly on the floor face and having a front cutting edge lying radially outside the surface and a rear side confronting and angularly spaced from the rear face of the seat;

blade bolts extending generally radially of the axis through the blade, seated in the body, and securing the blade to the floor face such that, when the blade bolts are not tightened, the respective blades can move limitedly tangentially of the body on the floor face;

a plurality of axially spaced spacer blocks each having a rear edge bearing directly against the rear face of the seat and a front edge bearing directly against the rear side of the blade; and respective block bolts extending through the blocks into the body and securing the blocks in the seat to the body.

8. The cutter drum defined in claim 7 wherein the main part is formed by an inner sleeve of fiber-reinforced plastic whose fiber reinforcement runs at an angle of between 30° and 60° to the axis, and an outer sleeve of fiber-reinforced plastic whose fiber reinforcement runs at an angle of less than 30° to the axis.

9. The cutter drum defined in claim 8 wherein the angle of the inner-sleeve reinforcement is about 45°.

10. The cutter drum defined in claim 8 wherein the angle of the outer-sleeve reinforcement less than 10°.

11. The cutter drum defined in claim 1 wherein the body is steel.

* * * * *